United States Patent [19]

O'Keefe et al.

[11] 3,963,680

[45] June 15, 1976

[54] ONE-PART, ROOM-TEMPERATURE LATENT, CURABLE ISOCYANATE COMPOSITIONS

[75] Inventors: Donald R. O'Keefe, St. Paul; A. Joseph Gasper, Minneapolis, both of Minn.

[73] Assignee: Minnesota Mining and Manufacturing Company, St. Paul, Minn.

[22] Filed: Mar. 17, 1975

[21] Appl. No.: 559,238

[52] U.S. Cl. ............... 260/77.5 NC; 260/75 NC; 260/77.5 AC; 260/77.5 R; 260/858; 260/859 R
[51] Int. Cl.² ............... C08G 18/18; C08G 18/82; C08G 18/00
[58] Field of Search ............... 260/77.5 NC, 75 NC, 260/77.5 AC

[56] References Cited
UNITED STATES PATENTS

| 3,620,986 | 11/1971 | Diehr et al. | 260/77.5 NC |
| 3,736,298 | 5/1973 | Schmit et al. | 260/77.5 NC |
| 3,748,313 | 7/1973 | Bulbenko et al. | 260/77.5 AA |
| 3,860,565 | 1/1975 | Barber et al. | 260/77.5 NC |

*Primary Examiner*—H. S. Cockeram
*Attorney, Agent, or Firm*—Alexander, Sell, Steldt & DeLaHunt

[57] ABSTRACT

A one-part, room-temperature latent, curable isocyanate composition is prepared comprising an aliphatic or aromatic polyisocyanate having dispersed therethrough capsules containing a viscous liquid catalyst solution capable of curing the polyisocyanate. The capsules comprise a shell wall of partially polymerized isocyanate, wherein the partially polymerized isocyanate contains linkages selected from the group consisting essentially of urea, urethane, and isocyanurate linkages.

19 Claims, No Drawings

ONE-PART, ROOM-TEMPERATURE LATENT, CURABLE ISOCYANATE COMPOSITIONS

BACKGROUND OF THE INVENTION

This invention relates to one-part, room-temperature latent, curable liquid isocyanate compositions. More particularly, it relates to such compositions wherein a trimerization catalyst solution is encapsulated by a shell wall comprising partially polymerized isocyanate.

Isocyanurate resins and catalysts for forming the same are known in the art, see Saunders and Frisch, *Polyurethanes: Chemistry and Technology;* Part I, pp. 94–97, Interscience Publishers, New York (1962). Examples of known isocyanate trimerization catalysts include tertiary amines, alkali metal hydroxides, alkali and alkaline earth metal salts of carboxylic acids, metal alkoxides, xanthate salts, quaternary ammonium hydroxides, etc.

Known catalysts for trimerizing isocyanates can be divided into two general classes. First, those that cause trimerization of isocyanate exothermally at room temperature and second, those that trimerize isocyanates only at elevated temperatures and prolonged reaction times. The first group lacks latency and therefore may be used only in two-part compositions. The second group generally has a short shelf life (e.g. several weeks) and requires long cure times (e.g. several hours at elevated temperatures).

Curable resin compositions containing encapsulated catalysts are known. Examples of such compositions include the polyepoxide compositions containing capsules having a hardened, inactive colloid shell wall (e.g. gelatin) about a curing agent that are disclosed in U.S. Pat. No. 3,018,258. Such compositions are substantially unreactive under normal temperatures, having shelf life of several months, but require prolonged heating (e.g. 24 hours) in order to cure. U.S. Pat. No. 3,455,848 discloses stable compositions that contain an intimate mixture of polyurethane components, at least one of the components being contained in capsules having a shell wall of gelatin. On heating the composition, the encapsulated component reacts with the unencapsulated component or components to form a polyurethane.

U.S. Pat. No. 3,467,544 discloses resin compositions comprising an encapsulated polysulfide. A gelatin capsule wall contains a metal oxide catalyst suitable for curing the polysulfide. Upon rupture of the capsules, polysulfide is released contacting the catalyst and curing takes place.

U.S. Pat. No. 3,505,254 discloses polysulfide compositions containing encapsulated metal oxide, which compositions cure upon breaking of the capsule shell walls. The shell walls can be lignin sulfonates, phenol, formaldehyde penterythritrol esters, etc.

Processes for microencapsulation of materials are also known. A general microencapsulation reference is *Capsule Technology and Microencapsulation*, Noyes Data Corp., Park Ridge, N.J. (1972). In these processes a polymer is caused to separate from a continuous liquid phase and form a solid shell wall about liquid or solid particulate material suspended in the continuous phase. There are several general microencapsulation processes for accomplishing this. In one such process, known as "simple coacervation," a polymer separates from a solvent solution of the polymer by the action of a precipitating agent that reduces the solubility of the polymer in the solvent (e.g. a salt or a nonsolvent for the polymer). Patents describing such processes and their shell wall material include U.S. Pat. Nos. 2,800,458 (hydrophilic colloids); 3,069,370 and 3,116,216 (polymeric zein); 3,137,631 (denatured proteins); 3,418,250 (hydrophobic thermoplastic resins); and others.

In another such process, known as "complex coacervation" a polymer having an electric charge of one polarity is caused to separate from solution by the addition of another polymer having the opposite polarity, whereby the first polymer is encapsulated by the second polymer. Patents describing such processes include U.S. Pat. Nos. 2,800,457 (complex colloid); 3,317,434 (gelatin); 3,324,065; and others.

In yet another encapsulation process, a shell wall is formed about suspended particulate material by an interfacial polycondensation reaction. In this process, the material to be encapsulated is mixed with a solution of one component of a polycondensation reaction and the mixture dispersed in a non-solvent for the mixture. A second component of the polycondensation reaction is then added to the resulting dispersion. The subsequent reaction forms a shell wall of polycondensate about each dispersed droplet at its interface. Patents describing such processes include U.S. Pat. Nos. 3,427,250; 3,565,818; 3,575,882; 3,577,515; 3,594,328; and others.

In a variation of the interfacial polymerization process, encapsulation is accomplished by an interfacial addition polymerization. In this process, particulate material is suspended in a solution of a polymerizable, ethylenically unsaturated compound in a solvent. This solvent is not a solvent for the polymer formed from the unsaturated compound. The unsaturated compound is polymerized such as by the use of free radical initiators. The resulting polymer forms a shell wall about the suspended particulate material. Patents describing such processes include U.S. Pat. No. 3,427,250 and others.

None of these patents disclose one-part, room-temperature latent, curable isocyanate compositions that have prolonged storage stability and a rapid cure.

However, in U.S. Pat. No. 3,860,565 (Barber) there is disclosed a one-part, room-temperature latent, curable isocyanate-catalyst system that comprises an aromatic polyisocyanate material having dispersed therein an encapsulated liquid isocyanate trimerization catalyst comprising a viscous solution of an alkali metal salt of an organic acid in a lower polyhydric alcohol. The liquid trimerization catalyst is encapsulated by a shell wall comprising partially polymerized isocyanate that is impermeable to said catalyst at room temperature but permeable to said catalyst at about 75°C.

The system disclosed in U.S. Pat. No. 3,860,565 requires from 30 minutes to one hour before a shell wall forms which is impermeable to the catalyst at room temperature. Moreover, that patent discloses systems wherein the catalyst solution may comprise up to about 30 percent by weight of the system during encapsulation. The concentration of the encapsulated catalyst solution is then preferably reduced to from about 0.1 to 5 percent by weight of the system by dilution with additional polyisocyanate. The resulting systems have good shelf stability.

The present invention is an improvement upon the prior art. It provides one-part, room-temperature latent, curable isocyanate compositions which can contain up to 50 percent by weight encapsulated catalyst and which can also be diluted with a wide variety of polyisocyanates and still have good shelf stability at room temperature.

SUMMARY OF THE INVENTION

In accordance with the present invention there is provided a one-part room-temperature latent, curable isocyanate composition comprising:

a polyisocyanate material selected from the group consisting of aromatic and aliphatic polyisocyanates; and an encapsulated liquid trimerization catalyst, having a viscosity greater than about 5,000 centipoise at 25°C dispersed throughout said polyisocyanate, wherein a primary or secondary organic polyfunctional amine in an amount of from about 1 to 25 percent by weight of said liquid catalyst is included in said liquid catalyst, and wherein said liquid catalyst is encapsulated in capsules having a shell wall comprising partially polymerized isocyanate containing linkages selected from the group consisting essentially of urea, urethane, and isocyanurate linkages, said capsule shell wall being impermeable to said liquid catalyst at room temperature. Said capsule shell wall becomes permeable to said liquid catalyst when activated by heat or solvent.

In another embodiment of the present invention there is provided an improvement in the compositions of U.S. Pat. No. 3,860,565 comprising the inclusion in the liquid trimerization catalyst solution thereof of a primary or secondary organic polyfunctional amine in an amount of from about 1 to 25 percent by weight of said liquid catalyst. Said liquid catalyst is encapsulated in capsules having a shell wall comprising partially polymerized isocyanate containing linkages selected from the group consisting essentially of urea, urethane, and isocyanurate linkages. Said shell wall is impermeable to said liquid catalyst at room temperature. Said shell wall becomes permeable to said liquid catalyst when activated by heat or solvent.

The capsule shell wall of compositions of the present invention forms about droplets of the liquid catalyst solution as said droplets are being dispersed. Generally this requires less than about two minutes. Consequently the compositions of the present invention can be used immediately.

The compositions of this invention are useful in a variety of ways. For example, they are useful as master solutions from which polyisocyanate diluted compositions can be prepared. Additionally, they are useful as moulding, casting, and potting compounds. They are also useful as adhesives, paints, and protective coatings for plastics, metals, etc. They may also be used in making composites (e.g. in plywood fabrication and in lamination of wood to fiberglass) and in repairing or patching reinforced laminates (e.g. plywood).

DETAILED DESCRIPTION OF THE INVENTION

Curable compositions of the present invention are prepared by dispersing a viscous liquid trimerization catalyst solution in a medium of polyisocyanate whereby capsules are formed having a core of liquid catalyst solution surrounded by a shell wall. The liquid catalyst solution used comprises an alkali metal salt of an organic acid in an organic solvent. Included in said liquid catalyst solution is a primary or secondary organic polyfunctional amine. The polyisocyanate material in which the liquid catalyst solution is dispersed has at least two isocyanate groups per molecule and may be either aliphatic or aromatic in type.

Suitable alkali metal salts for use in the liquid catalyst solution are those alkali metal salts of organic acids having a $pK_a$ between about 2.5 and 10. Preferably the $pK_a$ is between about 3 and 6. Organic acids having a $pK_a$ between 3 and 6 provide catalysts that are easily synthesized, exhibit good shelf stability when encapsulated and dispersed in polyisocyanate materials, yet cure rapidly when activated. Generally speaking the alkali metal salts used are the alkali metal salts of mono- or poly-carboxylic acids and phenols having from about 2 to 8 carbon atoms. Preferably they are salts of mono- or poly-carboxylic acids having from about 2 to 5 carbon atoms.

Representative examples of suitable alkali metal salts useful in the liquid catalyst solution include sodium lactate, potassium lactate, rubidium lactate, potassium glycolate, potassium hydroxyisobutyrate, potassium 2-hydroxypropionate, potassium acetate, potassium butyrate, sodium butyrate, lithium octoate, potassium cyanoacetate, dipotassium oxalate, disodium succinate, dilithium adipate, dipotassium adipate, potassium mandelate, disodium phthalate, sodium phenoxide, potassium p-chlorophenoxide, sodium m-cresoxide and the like. A preferred salt is an alkali metal salt of lactic acid, and potassium lactate is the most preferred salt.

Solvents that can be used to dissolve the alkali metal salts, to form a viscous liquid catalyst solution are generally polar organic compounds and preferably have a boiling point sufficiently higher than water so that the solvent can be made essentially anhydrous (e.g. have a water content of 1 percent or less) by azeotropic distillation. Representative examples of such solvents include lower polyhydric alcohols having from about 2 to 8 carbon atoms, such as ethylene glycol, propylene glycol, glycerine, 1,4-butanediol, 1,2,4-butanetriol, 2,2'-oxydiethanol, 3,3'-oxydipropanol, 1,1,1-trimethylolpropane, 1,2,3-trimethylolpropane and the like and mixtures of such polyhydric alcohols; formamide, N-methyl-formamide, ethylene carbonate, 4-butyrolactone, pyrolidone, N-methyl pyrrolidone and the like and mixtures of such solvents. The preferred solvents are the lower polyhydric alcohols, and glycerine is the most preferred solvent.

The solubility of the alkali metal salt catalysts in the solvent is such that the liquid catalyst solution will generally contain more than 15 percent by weight of such salt, and preferably about 50–75 percent by weight or more. The resulting solutions will generally have a viscosity of at least 5000 centipoise or greater at temperatures up to about 50°C, preferably a viscosity greater than about 100,000 centipoise at temperatures up to about 40°C.

Suitable primary or secondary organic polyfunctional amines for inclusion in the liquid catalyst solution comprise from about 1 to 25 percent, and preferably from about 4 to 25 percent by weight of said liquid catalyst solution. The polyfunctional amines are preferably soluble in the liquid catalyst solution, although those that are readily dispersible therein may also be used.

The primary polyfunctional amines may be represented by the general formula:

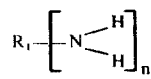

wherein $R_1$ is selected from the group consisting of aryl, alkaryl, aralkyl, alkyl, cycloalkyl, and alkenyl radicals wherein the aryl, alkaryl, and aralkyl radicals contain from about 6 to 20 carbon atoms, the alkyl radicals contain from about 1 to 18 carbon atoms, the cycloalkyl radicals contain from about 6 to 18 carbon atoms, the alkenyl radicals contain from about 3 to 18 carbon atoms, and n is a positive integer of from 2 to 5.

Secondary polyfunctional amines may be represented by the formulae:

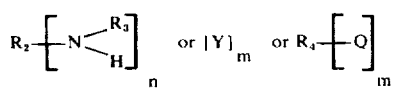

wherein $R_2$ and $R_3$ are the same or different and are selected from the group consisting of $R_1$ and saturated 5 or 6 membered heterocyclic radicals containing from one to three nitrogen atoms, the balance of the heterocycle containing 2 to 5 carbon atoms; Y comprises a saturated 5 or 6 member heterocyclic compound containing from one to three nitrogen atoms, at least one of which is a secondary nitrogen, the balance of the heterocycle containing from 2 to 5 carbon atoms; $R_4$ is selected from the group consisting of $R_1$ and $R_2$; Q comprises a saturated 5 or 6 member heterocyclic radical containing from one to three nitrogen atoms, at least one of which is a secondary nitrogen, the balance of the radical containing from 2 to 5 carbon atoms; n is as described above; and m is a positive integer of from 1 to 5.

The polyfunctional amines may be substituted or unsubstituted. When they are substituted, it is preferred that the substituting groups be nonreactive toward the liquid catalyst solution. Representative examples of allowable substituting groups include oxygen, nitrogen, halogen, hydroxyl, $NO_2$, carbonyl, etc.

Representative examples of primary polyfunctional amines useful in the present invention include 3,3'-dimethyl-4,4'-biphenyl diamine; 4,4'-biphenyl diamine; methylene dianiline, p-phenylenediamine; hexamethylene diamine; 1,2-ethane diamine; tetraethylene pentamine; a tris-2 amino propyl ether such as the amine terminated condensation product of a triol and propylene oxide ("Jeffamine" T-403 commercially available from Jefferson Chemical Co.); 1,8-diamino-p-menthane; and combinations of saturated and unsaturated straight chain aliphatic diamines (such as "Adogen" 560 commercially available from Ashland Chemical Co.). Other useful primary amines of the type described are known to the art.

Representative examples of secondary polyfunctional amines useful in the present invention include piperazine; 2-methyl piperazine; and 1,3-di(4-piperdyl)-propane ("DiPip" commercially available from Reilly Tar Chemical Co.). Other useful secondary amines include 4-methylamino piperidine; 2-methylamino pyrrolidine; hexahydropyrimidine; hexahydro-s-triazine; imidazolidine; 2,2'-bipyrrolidine; 4,4'-bipiperidine; 1,3-di(3-pyrrolidinyl)-propane; 1,3-di(4-piperazinyl)propane and derivatives thereof.

Suitable polyisocyanates for use in compositions of the present invention have at least two isocyanate groups per molecule and may be aliphatic or aromatic. The preferred polyisocyanates for use as the continuous medium during encapsulation are the polymeric polyisocyanates. When it is desired to dilute compositions of the present invention with additional polyisocyanates it is peferred that an isocyanate-terminated prepolymer, such as a polyoxyalkylene backbone terminated with aromatic isocyanate, be used.

Representative examples of polyisocyanates useful in the present invention include 3-isocyanatomethyl-1,3, 5,5-trimethyl-cyclohexylisocyanate; 4,4'diisocyanatobis-cyclohexane and isomeric mixtures thereof (such as "Hylene" W, commercially available from DuPont); hexamethylene diisocyanate; 2,4- and 2,6-toluene diisocyanates; 1,5-naphthalene diisocyanate; 4,4'-diisocyantodiphenylmethane; 3,3'-dimethyl-4,4'-diphenylene diisocyanate; polymethylene polyphenyl polyisocyanates, also known as polymeric isocyanates, such as those sold commercially under the trademarks "Mondur" MR, MRS and M-432, (available from Mobay Co.), "Isonate" 901 and 390P and "PAPI" (available from Upjohn).

Isocyanate-terminated prepolymers, also known as urethane prepolymers, that are useful in the present invention are known to the art (e.g. see U.S. Pat. Nos. 3,073,802 and 3,054,755).

Such prepolymers may be prepared by reacting polyisocyanates with a polyol such as polyoxyalkylene polyol, typically polyoxyethylene or polyoxypropylene glycol, using excess isocyanate. In place of polyoxyalkylene polyols, polyesters and polyamides containing reactive hydroxyl groups can also be used as the backbone of the isocyanate-terminated prepolymer.

Polyoxyalkylene polyols are generally condensates of ethylene, propylene or butylene oxides with glycerol, pentaery thritol, sorbitol, sucrose, methylglucosides or low molecular weight polyols such as propylene glycol, tri-, tetra-, penta-, hexamethylene glycols, 1,3-butylene glycol, 1,3 (2-ethyl) hexanediol, 2,2,4-trimethyl-1,3-pentanediol, trimethylol propane, 1,2,6-hexanetriol or phenyldiisopropanolamine.

Suitable polyols for use as backbones in isocyanate-terminated prepolymers can have varying molecular weights (e.g. from about 90 to 3000 or even as high as 15000). Where a harder (e.g. more highly crosslinked) polyisocyanurate is desired, the polyol will generally have a hydroxyl equivalent weight of about 45–400 (i.e. one reactive hydroxyl group per 45–400 molecular weight of polyol.) Where a softer, tougher (e.g. less highly crosslinked) polyisocyanurate is desired, th polyol will generally have a molecular weight of 400 to 1000 or higher. Where the isocyanate-terminated urethane prepolymer is made from polyisocyanate-polyol reaction mixtures, the mixtures can have NCO/OH equivalent ratios greater than 1, preferably at least 1.2/1 to 6/1.

Where a more highly crosslinked polyisocyanurate is desired, a polyol-isocyanate starting mixture may also include a conventional triisocyanate or triol. The mixture may also include modifying monoisocyanates or alcohols such as 1,4-butane diol, butyl "Cellosolve" (a monobutyl ether of ethylene glycol commercially available from Union Carbide), butyl "Carbitol" (a monobutyl ether of diethylene glycol commercially available from Union Carbide) and oleyl alcohol to impart special properties to the polymer product such as the degree of final hardness.

Lists of commercially available isocyanates that may be used in this invention may be found in Kirk and Othmer, Encyclopedia of Chemical Technology, Vol., 12, 2nd Ed., pp. 46–47, Interscience Publishers (1967) and Appendix A of Saunders and Frisch, *Polyurethanes: Chemistry and Technology*, Part I, Interscience Publishers, New York (1962).

The viscous liquid catalyst solution can be directly synthesized by mixing the alkali metal salt and solvent or, alternatively, it may be prepared by reacting alkali metal salt precursors in a solution of the selected solvent to form the desired catalyst and subsequently azeotroping off any resulting water using an azeotroping fluid (e.g. toluene) to for a substantially anhydrous catalyst solution. After azeotroping, any remaining organic solvents can be removed (e.g. by means of vacuum distillation). For example, a potassium lactate-glycerine catalyst solution can be prepared by reacting an aqueous solution of lactic acid with potassium hydroxide in a minimum of water and glycerine. Toluene is added to the mixture and the reaction vessel is fitted with a water separator. The solution is then azeotroped until no more water can be driven off of the reaction mixture. At this point, the solution generally contains 1 percent or less of water. The toluene is then removed by reduced pressure distillation. The liquid catalyst solution is then admixed with the primary or secondary organic amine.

The liquid catalyst solution is then encapsulated by dispersing said liquid catalyst solution (containing the primary or secondary amine) into a continuous medium of polyisocyanate under conditions of high shear. Preferably the viscosity of the polyisocyanate is no greater than about 10,000 centipoise at 25°C. When using polyisocyanates having viscosities greater than this, it is possible that the heat generated when dispersing liquid catalyst solution therein may activate trimerization. Capsules form about the discrete droplets of catalyst solution within less than about two minutes via interfacia polycondensation reactions between the isocyanate and the droplets of catalyst solution. During dispersion of the catalyst solution and concurrent capsule formation there is a mild exotherm and the temperature of the system is controlled so that it does not rise above about 50°C, and preferably not above 40°C, so as to prevent premature trimerization of the entire composition.

Encapsulation can be performed in batches or continuously. In any event, means capable of providing a fine dispersion of the liquid catalyst solution in a polyisocyanate is required. For example, a high shear mixing apparatus (e.g. blender) that will break the catalyst solution into a very fine dispersion may be used. As the catalyst solution is dispersed in the polyisocyanate a capsule shell wall of partially polymerized isocyanate containing linkages selected from the group consisting essentially of urea, urethane, and isocyanurate linkages forms around each droplet. The urea linkages result from the reaction of the polyisocyanate with the primary or secondary amine. This reaction proceeds more rapidly than the competing reactions that result in the formation of urethane and isocyanurate linkages. Urethane linkages result from the reaction of the polyiocyanate with the polyhydric alcohols present in the liquid catalyst solution. Isocyanurate linkages result from the reaction of the polyisocyanate with the alkali metal salt catalyst.

The capsules obtained comprise a distribution of aspherical (e.g. needle-like and tubular configurations) and spherical capsules. Aspherical capsules may have a maximum dimension of from about 1 to 1000 microns, although a maximum dimension of from about 1 to 120 microns is preferred. Spherical capsules generally have a diameter of from about 1 to 20 microns. The larger capsules are produced by low shear and vice versa. Because the capsules are relatively small, they can be uniformly dispersed throughout a polyisocyanate material to provide a rapid cure when activated.

The encapsulated liquid trimerization catalyst solution may comprise as much as about 50 percent by weight of the composition while still obtaining a composition having good storage stability. The individual capsules themselves are of such nature that they contain a viscous liquid trimerization catalyst solution (e.g. viscosity of at least 5000 centipoise at 25°C) at temperatures below about 50°C. At this temperature the composition exhibits good room-temperature latency unless activated by thermal or solvent means. Successful thermal activation requires that compositions containing the encapsulated liquid catalyst be heated above ambient temperature, such as above 50°C, and preferably above about 80°C, for a sufficient length of time to permit the catalyst solution to penetrate the shell wall and thereby initiate trimerization. Successful solvent activation requires that a suitable amount (e.g. from about 10 to 30 percent by weight of the composition) of an organic polar solvent be added to the composition. The solvent solvates the liquid catalyst solution thereby lowering is viscosity and allowing it to penetrate the shell wall. The solvent also solvates the polyisocyanate resulting in a solution of the polyisocyanate and liquid catalyst thereby facilitating the initiation of trimerization.

Representative examples of activating solvents suitable for use with the present invention are tetrahydrofuran, dimethylformamide, N-methyl pyrrolidone, dimethylsulfoxide, as well as polyols and alcohols. Monofunctional alcohols are generally not suitable activating solvents since they react with polyisocyanates to chain terminate the polymer thereby inhibiting trimerization.

The one-part, room-temperature latent, curable isocyanate compositions may be easily diluted, if desired, with conventional polyisocyanates by simple admixing. This is done without the intermediate step of isolating the capsules from the polyisocyanate in which they are formed. The diluted compositions may contain as little as 0.1 percent by weight of liquid catalyst solution and still be useful one-part curable compositions.

Various other ingredients can be added to compositions of the present invention. For example, a tertiary amine in an amount of about 3 to 25 percent by weight of the liquid catalyst solution may be added to the composition. The tertiary amine acts as a co-catalyst in the compositions and improves the curing efficiency thereof. That is the tertiary amine promotes polycondensation side reactions of isocyanate groups in polyisocyanate materials that do not otherwise cure upon activation. Preferably these side reactions take place at a rate slower than that of trimerization.

The tertiary amine co-catalyst may be easily added to the liquid catalyst solution (which also contains primary or secondary amine) prior to encapsulation or, alternatively, it may be added to the composition after encapsulation of the catalyst solution. Cured compositions of the present invention containing no tertiary amine co-catalyst exhibit a conversion of about 20–40 percent of the available isocyanate groups to isocyanate polycondensation reaction products while compositions containing the tertiary amine co-catalyst exhibit a conversion of about 80–100 percent of the available isocyanate groups to isocyanate polycondensation reaction products.

Tertiary amine co-catalysts useful in the present invention have a $pK_b$ of 6.5 or less. They comprise tertiary organic amines wherein the organic substituents may be the same or different and are selected from the group consisting of aryl, alkaryl, aralkyl, akyl, cycloalkyl and alkenyl radicals. The total number of carbon atoms contained in the three organic subsituents attached to any nitrogen atom is between about 3 and 20, provided that each substituent contains at last one carbon atom. Preferably the co-catalysts are soluble in the liquid catalyst solution or in the polyisocyanate. However, those that are easily dispersible in the liquid catalyst solution or the polyisocyanate are also useful.

The tertiary amine co-catalysts may be substituted or unsubstituted. When they are substituted it is peferred that the substituting groups be nonreactive toward the liquid catalyst solution. The tertiary amine co-catalyst may also be a mono- or poly-mine that as it may contain more than one tertiary amine group.

Representative examples of co-catalysts useful in the present invention include N,N'-dibutylaniline; N,N'-dimethyl aniline; trimethyl amine; N,N'-dimethyl-N-octadecylamine; N-methyl morpholine; N-methylpiperidine, N-methyldiethanol amine; and 1,4-diazo(2,2,2) bicyclooctane ("Dabco" commercially available from Houdry Process and Chemical Co.). Other useful tertiary amines of the type described are known to the art.

Other ingredients that may be added to compositions of the present invention include epoxy-functional liquid resins that promote adhesion of the cured compositions to various substrates such as steel, glass, aluminum, etc. Preferably they comprise from about 5 to 40 percent by weight of the composition. Representative examples of epoxy-functional resins useful in the present invention include 3,4-epoxy cyclohexylmethyl (3,4-epoxy) cyclohexane carboxylate (commercially available as "ERL" 4221 from Union Carbide); 1,4 butanediol diglycidyl ether (commercially available as "Araldite" RD-2 from Ciba Products); and the dehydrohalogenated condensation product of epichlorohydrin and bisphenol-A (commercially available as "Epon" 828 from Shell Chemical Co. and having an epoxy equivalent weight of about 182–200). Other useful liquid epoxy-functional resins are known to the art.

Filled resin products having significantly higher viscosities may be made by incorporating into the compositions of the present invention a host of different powdered, granular, particulate, fibrous or finely divided fillers such as clay, talc, glass beads or bubbles, metal powders, rubbery granular aggregate (such as scrap rubber obtained from tires), pigments (e.g. titanium dioxide, carbon black, etc.), diatomaceous earth, glass fibers and the like. Thixotropic characteristics may also be obtained when thixotropic agents (e.g. "Cabosil" commercially available from Cabot Corp.) are included in the formulations. "Cabosil" is a fumed silica of more than 99.8 percent silicon dioxide by weight, produced by hydrolyzing pure silicon tetrachloride vapor in a flame of purified hydrogen and oxygen.

A further understanding of the present invention may be had by reference to the following examples in which all parts are by weight unless otherwise noted.

EXAMPLE 1

One-part room-temperature latent, curable isocyanate compositions are prepared by dissolving a primary amine ("Jeffamine" T-403) in a liquid isocyanate trimerization catalyst solution (75 percent by weight potassium lactate/25 percent by weight glycerine). The resulting catalyst solutions are then dispersed throughout a polyisocyanate ("Mondur" MRS, "Mondur" M-432, or "Hylene" W) over a period of about 2 minutes in a "Waring" blender operated at maximum speed. A fine dispersion of droplets of each solution in the isocyanate results. An encapsulating shell wall of partially polymerized isocyanate containing linkages selected from the group consisting essentially of urea, urethane and isocyanurate linkages forms around each droplet. The temperature is maintained at about 35°–40°C during encapsulation. The resulting compositions have viscosities in the range of from about 1000–2000 centipoise and comprise a mixture of spherical and aspherical capsules (from about 1 to 60 microns maximum dimension) dispersed throughout a continuous medium of polyisocyanate. The compositions have good room-temperature shelf stability.

The compositions cure in 5 minutes or less when heat activated at about 150°C to form hard (greater than 90 Shore A hardness) resins. The compositions also cure in 5 minutes or less to form hard resins when solvent activated at room temperature by mixing 100 parts by weight of each composition with 20 parts by weight of tetrahydrofuran. The compositions may also be diluted with more of the same or a different polyisocyanate to form other useful one-part, room-temperature latent, curable isocyanate compositions.

Table I lists the compositions made in this Example.

TABLE I

| | COMPOSITIONS | | | | | | |
|---|---|---|---|---|---|---|---|
| | A | B | C | D | E | F | G |
| Liquid Trimerization Catalyst | 30 gm | 30 gm | 30 gm | 75 gm | 75 gm | 120 gm | 30 gm |
| Primary Amine | 1.5 gm | 3.75 gm | 7.5 gm | 3.75 gm | 3.75 gm | 6 gm | 3.75 gm |
| Isocyanate | | | | | | | |
| "Mondur" MRS | 270 gm | 270 gm | 270 gm | 225 gm | — | — | — |
| "Mondur" M-432 | — | — | — | — | 225 gm | 180 gm | — |
| "Hylene" W | — | — | — | — | — | — | 270 gm |

EXAMPLE 2

Three separate one-part, room-temperature latent, curable isocyanate compositions are prepared as described in Example 1, Composition A, except that diethylenetriamine, 4'-diaminophenylmethane and p-phenylenediamine are each used as the primary amine in place of "Jeffamine" T-403. The compositions made are listed in Table II below.

TABLE II

|  | COMPOSITIONS | | |
| --- | --- | --- | --- |
|  | H | I | J |
| Liquid Trimerization Catalyst | 30 gm | 30 gm | 30 gm |
| Primary Amine |  |  |  |
| Diethylenetriamine | 2 gm | — | — |
| 4,4'-diaminophenyl-methane | — | 2.5 gm | — |
| p-phenylenediamine | — | — | 2.5 gm |
| Isocyanate | 270 gm | 270 gm | 270 gm |

These compositions have viscosities of about 500 to 2000 centipoise and comprise a mixture of spherical and aspherical capsules (from about 1 to 100 microns maximum dimension) dispersed throughout a continuous medium of polyisocyanate. The compositions have good room-temperature shelf stability.

Composition H cures in 15 minutes or less when heat activated at about 150°C. Compositions I and J cure in 3 minutes or less when heat activated at about 250°C to form hard (greater than 90 Shore A hardness) resins. The compositions also cure in 5 minutes or less to form hard resins when solvent activated at room temperature by mixing 100 parts by weight of each composition with 20 parts by weight tetrahydrofuran. The compositions may also be diluted with more of the same or a different isocyanate to form other useful, room-temperature latent, curable compositions.

EXAMPLE 3

A one-part, room-temperature, latent curable isocyanate composition is prepared according to the procedure described in Example 1, Composition B, except that 3.75 grams of a secondary amine ("DiPip") is used in place of "Jeffamine" T-403. The resultant composition has a viscosity of about 1000 centipoise and comprises a mixture of spherical and aspherical capsules (from about 1 to 60 microns maximum dimension) dispersed throughout a continuous medium of polyisocyanate. The composition has good room-temperature shelf stability.

The composition cures in 3 minutes or less when heat activated at 150°C to form a hard (greater than 90 Shore A hardness) resin. The compositions also cure in 5 minutes or less to form hard resins when solvent activated at room temperature by mixing 100 parts by weight of each composition with 20 parts by weight of tetrahydrofuran. The composition may also be diluted with more of the same or a different polyisocyanate to form other useful room-temperature latent, curable compositions.

EXAMPLE 4

An isocyanate-terminated prepolymer is prepared by adding 200 parts of a polyoxyethylene glycol having a molecular weight of about 400 ("Carbowax" 400 commercially available from Union Carbide) to 191.4 parts of 2,4-toluene diisocyanate and agitating them for 4 hours. Cooling water is used to control the initial exotherm after which the temperature of the material is maintained at 70°C. The resultant prepolymer has an isocyanate eq. wt. of 335.4 and a viscosity of about 15,000 cps at 25°C.

Twenty parts by weight of Compositions A through J are each mixed with separate portions of the isocyanate-terminated prepolymer (100 parts by weight) of this Example. The resulting diluted, one-part, room-temperature latent, curable isocyanate compositions are degassed in a vacuum desiccator and then stored at room temperature (e.g. 25°C). The compositions have good room-temperature shelf stability.

The compositions cure in 3 minutes or less when heat activated at about 150°C or when solvent activated at room temperature by mixing 100 parts by weight of each composition with 20 parts by weight of tetrahydrofuran.

The tensile strength of cured resin samples made in accordance with this Example is about 230 kg/cm$^2$. Infrared analysis of these samples shows that about 90 or more percent of the available isocyanate groups react during cure.

EXAMPLE 5

Diluted one-part, room-temperature latent, curable isocyanate compositions are prepared by blending 20 parts by weight of Compositions A and B with 100 parts by weight of polyisocyanate comprising polytetramethyleneglycol endcapped with 2,4-toluene diisocyanate and having an isocyanate equivalent weight of 450 ("Adiprene" L-315 commercially avaiable from DuPont). The resulting compositions are degassed in a vacuum desiccator and then stored at room temperature (e.g. 25°C). The compositions have good shelf stability.

The compositions are heat activated at 150°C. The composition containing Composition A and "Adiprene" L-315 cures in 3 minutes or less. The composition comprising Formula B and "Adiprene" L-315 cures in 8 minutes and less. The compositions also cure in 5 minutes or less when solvent activated at room temperature by mixing 100 parts by weight of each composition with 20 parts by weight of tetrahydrofuran.

Infrared analysis of the compositions cured by heat activation shows that only about 20 to 40 percent of the available isocyanate sites react during cure. Upon aging the cured compositions at room temperature, infrared analysis shows that there is a slow continuous conversion of the remaining isocyanate groups to urea linkages as a results of their reaction with moisture in the air.

EXAMPLE 6

One-part, room-temperature latent, curable isocyanate compositions are prepared by dissolving a tertiary amine cocatalyst (N-methyldiethanolamine and a primary amine ("Jeffamine" T-403) in a liquid isocyanate trimerization catalyst solution (75 percent by weight potassium lactate/25 percent by weight glycerine). The resulting catalyst solutions are then dispersed throughout a polyisocyanate ("Mondur" MRS) over a period of about 2 minutes in a "Waring" blender operated at maximum speed. A fine dispersion of droplets of each solution in the polyisocyanate results. An encapsulating shell wall of partially polymerized isocyanate containing linkages selected from the group consisting essentially of urea, urethane and isocyanurate linkages forms around each droplet. The temperature is maintained at about 35°–40°C during encapsulation. The resulting compositions have viscosities in the range of from about 1000-2000 centipoise and comprise a mixture of spherical and aspherical capsules (from about 1 to 100 microns maximum dimension) dispersed throughout a continuous medium of polyisocyanate. The compositions have good room-temperature shelf stability.

The compositions cure to form hard resins in 3 minutes or less when heat activated at 150°C and in 5 minutes or less when solvent activated at room temperature by mixing 100 parts by weight of the compositions with 20 parts by weight of tetrahydrofuran. The compositions may also be diluted with more of the same or a different polyisocyanate to form other useful one-part, room-temperature latent, curable isocyanate compositions.

Table III lists the compositions made in this Example.

TABLE III

| | COMPOSITIONS | | | | |
|---|---|---|---|---|---|
| | K | L | M | N | O |
| Liquid Trimerization Catalyst | 30 gm | 30 gm | 30 gm | 30 gm | 30 gm |
| Primary Amine | 1.5 gm | 2 gm | 2 gm | 2 gm | 2 gm |
| Tertiary Amine | 6 gm | 6 gm | 4 gm | 2 gm | 1 gm |
| Isocyanate | 270 gm | 270 gm | 270 gm | 270 gm | 270 gm |

EXAMPLE 7

Diluted one-part, room-temperature latent, curable isocyanate compositions are prepared by mixing 20 parts by weight of each of Compositions K through O with 100 parts by weight of "Adiprene" L-315. The resulting compositions are degassed in a vacuum desiccator and then stored at room temperature (e.g. 25°C). The compositions have good room-temperature shelf stability.

The compositions cure in 5 minutes or less when heat activated at 150°C or when solvent activated at room temperature by mixing 100 parts by weight of the compositions with 20 parts by weight of tetrahydrofuran. Infrared analysis of cured samples shows that 80 to 90 or more percent of the available isocyanate groups react during cure.

EXAMPLE 8

An isocyanate-terminated prepolymer is prepared as described in Example 4. One hundred parts of this prepolymer is mixed with 20 parts of Composition K to form a diluted one-part, room-temperature latent, curable isocyanate composition. The composition is degassed in a vacuum desiccator and then stored at room temperature (e.g. 25°C). The composition exhibits good shelf stability. The composition cures in 60 seconds or less when heat activated at 150°C and in 3 minutes or less when solvent activated at room temperature by mixing 100 parts by weight of the composition with 20 parts by weight of tetrahydrofuran.

EXAMPLE 9

A one-part, room-temperature latent, curable isocyanate composition is prepared as described in Example 6, Composition K, except that 2 grams of 1,4-diazo(2,2,2) bicyclooctane is used in place of 1.5 grams of N-methyldiethanolamine.

Twenty parts by weight of this composition is diluted with 100 parts by weight of "Adiprene" L-315 to form a useful one-part, room-temperature latent, curable isocyanate composition. The composition is degassed in a vacuum desiccator and then stored at room temperature. The composition exhibits good shelf stability. The composition cures to form a hard resin in 5 minutes or less when heat activated at 150°C or when solvent activated at room temperature by mixing 100 parts by weight of the composition with 20 parts by weight of tetrahydrofuran. Infrared analysis of the cured specimen shows that about 80 to 90 or more percent of the availble isocyanate sites react during cure.

EXAMPLE 10

Forty parts by weight of a liquid epoxy-functional resin ("Epon" 828) are mixed with 20 parts by weight of Composition K and 100 parts by weight "Adiprene" L-315 to form an epoxy-containing one-part, room-temperature latent, curable isocyanate composition. A one-part, room-temperature latent, curable isocyanate control composition is also prepared by mixing 20 parts by weight of Composition K with 100 parts by weight of "Adiprene" L-315. The resulting compositions are degassed in a vacuum desiccator. The compositions are applied to various substrates. They cure in 5 minutes or less when heat activated at 150°C. The cured samples are tested for pencil hardness and adhesion to various substrates. The results of these tests are given in Table IV.

Pencil hardness is determined by pushing pencils of varying hardness having flat points across the surface of the cured sample at a 45° angle thereto. The pencils generally vary in hardness from 4B to 5H. The hardness is taken to be the hardest pencil that does not scratch the surface of the cured sample.

Adhesion of the cured compositions to the substrate is measured by cutting the cured coating through with a sharp edge in a series of parallel lines about 0.318 cm. apart and then with a similar series of parallel lines at right angles to the first series, also spaced about 0.318 cm. apart. A total of fifty squares are thereby cut through the cured coating. A section of "Scotch" Brand Magic Transparent Tape No. 810 is firmly pressed into contact with the coated surface so as to cover the entire cross-hatched area. The tape is then rapidly manually stripped from the substrate at a 90° angle to it. Adhesion is rated at 0 to 100 percent. For each square that is removed during the test, the adhesion value is reduced by 2 percent from a maximum of 100 percent.

Table IV

| | Epoxy-Containing Composition | Control |
|---|---|---|
| Pencil Hardness | F | F |
| Adhesion | | |
| Cold rolled steel | 100% | 15% |
| Aluminum | 95% | 0% |

Table IV-continued

| | Epoxy-Containing Composition | Control |
|---|---|---|
| Glass | 45% | 0% |

EXAMPLE 11

An isocyanate-terminated prepolymer is prepared according to the procedure described in Example 4 by adding 1.6 hydroxyl equivalents of a polyoxypropylene glycol having a molecular weight in the range of from about 400–425 ("PPG" 425 commercially available from Union Carbide), 0.125 hydroxyl equivalents of a polyoxypropylene glycol having a molecular weight of about 1000 ("PPG" 1025 commercially available from Union Carbide), 0.125 hydroxyl equivalents of a copolymer comprising 85 percent butadiene and 15 percent acrylonitrile having a molecular weight of about 4400 ("Poly bd CN15" commercially available from Arco Chemical Co.), and 3.885 isocyanate equivalents of 2,4-toluene diisocyanate.

Two separate one-part, room-temperature latent, curable isocyanate compositions are then prepared. The first comprises 20 parts by weight of Composition K, 40 parts by weight of "Epon" 828, and 100 parts by weight of the prepolymer of this example. The second composition or control, comprises 20 parts by weight of Composition K and 100 parts by weight of the prepolymer of this example.

Overlap shear bonds (2.5 cm. overlap) are made using the compositions of this example ad 2024 T 3 clad aluminum panels and a 75 micron thick glue line. The bonds cure in 3 minutes or less when heat activated at 150°C. Overlap shear is measured on an "Instron" tensile tester commercially available from Instron Engineering Corp. by pulling the panels in opposite directions at a uniform rate of 2.5 cm/min. The epoxy-containing composition has an average overlap shear strength of 147.5 kg/cm². The control has an average overlap shear strength of 104.5 kg/cm².

EXAMPLE 12

An isocyanate-terminated prepolymer is prepared according to the procedure described in Example 4 except that the polyoxyethylene glycol used has a molecular weight of about 1000 ("Carbowax" 1000 commercially available from Union Carbide). The resulting prepolymer has an isocyanate eq. wt. of about 642 and a viscosity of about 5520 centipoise. Fifty parts of this prepolymer are blended with 50 parts of the prepolymer of Example 4.

One hundred parts of the prepolymer blend are mixed with 20 parts of the Composition K. The resultant diluted one-part, room-temperature latent, curable isocyanate composition is deaerated for 45 minutes and then coated onto 0.32 cm. thick sheets of polycarbonate to a thickness of about 16 microns by means of a No. 18 wire wound coating bar. Some of the coated samples are heat activated at 115°C for 2 minutes while the remainder are heat activated at 115°C for 5 minutes. All coatings cure.

The resultant cured coatings are tested for solvent resistance to xylol by applying a liberal amount of xylol to the cured surface, vigorously rubbing the surface with a lintfree towel for five minutes, drying the surface and then visually inspecting for solvent damage. No visible damage is found to any of the coatings.

EXAMPLE 13

An isocyanate-terminated prepolymer is prepared according to the procedure described in Example 4 by adding 1.6 hydroxyl equivalents of a polyoxypropylene glycol having a molecular weight of from about 400–425 ("PPG" 425 commercially available from Union Carbide), 0.125 hydroxyl equivalents of a polyoxypropylene glycol having a molecular weight of about 1000 ("PPG" 1025 commercially available from Union Carbide), 0.25 hydroxyl equivalents of a copolymer comprising 85 percent butadiene and 15 percent acrylonitrile having a molecular weight of about 4400 ("Poly bd CN15" commercially available from Arco Chemical Co.), and 4.01 isocyanate equivalents of 2,4-toluene diisocyanate.

To 100 parts of this prepolymer are added 50 parts of inert filler (calcium carbonate, 0.5 percent by weight maximum moisture content), 40 parts 3,4-epoxycyclohexyl methyl (3,4epoxy) cyclohexane carboxylate ("ERL" 4221 commercially available from Union Carbide), 0.94 parts of viscosity control agent (0-diethyl bisaniline), and 20 parts of Composition B.

The resulting diluted one-part, room-temperature latent, epoxy-containing, filled, curable isocyanate composition is degassed and used to bond aluminum refrigeration tubes to aluminum panels. The isocyanate composition is applied to the panel in a series of parallel beads of about 0.31 cm. diameter. The refrigeration tubes are pressed into the beads of isocyanate composition (one tube/bead) and clamped in place. The bonds cure in 2 minutes or less when heat activated in a 260°C oven. The temperature of the glue lines of the bonds reaches only about 170°C. The peel strength of the bonds is measured by attaching a spring balance to one end of the tubes and pulling them from the panel at a 90° angle. Approximately 22 to 28 kilograms of force are necessary to pull the tubes from the panel.

What is claimed is:

1. In a one-part, room-temperature latent, curable isocyanate composition comprising:
   an aromatic polyisocyanate material; and
   an encapsulated liquid trimerization catalyst dispersed throughout said polyisocyanate, said liquid catalyst comprising a solution of a metal salt of an organic acid in a lower polyhydric alcohol and having a viscosity of greater than about 5,000 centipoise at 25°C, said liquid catalyst being encapsulated in capsules having a shell wall comprising partially polymerized isocyanate, said capsule shell wall being impermeable to said liquid catalyst at room temperature but permeable to said catalyst when activated by heat or solvent means;
   the improvement comprising the inclusion in said liquid catalyst of a primary or secondary organic polyfunctional amine in an amount of from about 1 to 25% by weight of said liquid catalyst, wherein said partially polymerized isocyanate contains linkages selected from the group consisting essentially of urea, urethane and isocyanate linkages.

2. The composition of claim 1 wherein said polyisocyanate comprises a polymethylene polyphenyl polyisocyanate.

3. The composition of claim 1 wherein said polyisocyanate comprises an isocyanate-terminated prepolymer comprising polyoxyalkylene terminated with an aromatic polyisocyanate.

4. The composition of claim 1 wherein said liquid catalyst comprises a solution of potassium lactate in glycerine.

5. The composition of claim 1 wherein said polyfunctional amine comprises a primary amine.

6. The composition of claim 5 wherein said primary organic polyfunctional amine comprises the amine terminated condensation product of a triol and propylene oxide.

7. The composition of claim 1 wherein there is further included in said composition an organic tertiary amine having a $pK_b$ of 6.5 or less in an amount of from about 3 to 25 percent by weight of said liquid catalyst.

8. The composition of claim 7 wherein said tertiary amine comprises N-methyldiethanol amine.

9. A one-part, room-temperature latent, curable isocyanate composition comprising:
a polyisocyanate material selected from the group consisting of aromatic and aliphatic polyisocyanates; and
an encapsulated liquid trimerization catalyst dispersed throughout said polyisocyanate, said liquid catalyst comprising a solution of a metal salt of an organic acid in a lower polyhydric alcohol and having a viscosity of greater than about 5,000 centipoise at 25°C, wherein a primary or secondary organic polyfunctional amine in an amount of from about 1 to 25 percent by weight of said liquid catalyst is included in said liquid catalyst, and wherein said liquid catalyst is encapsulated in capsules having a shell wall comprising partially polymerized isocyanate containing linkages selected from the group consisting essentially of urea, urethane and isocyanate linkages, said capsule shell wall being impermeable to said liquid catalyst at room temperature but permeable to said catalyst when activated by heat or solvent means.

10. The composition of claim 9 wherein said polyisocyanate is an aliphatic polyisocyanate.

11. The composition of claim 10 wherein said aliphatic polyisocyanate comprises 4,4'-diisocyanato-bis-cyclohexyl methane.

12. The composition of claim 9 wherein said polyisocyanate is an aromatic polyisocyanate.

13. The composition of claim 12 wherein said aromatic polyisocyanate comprises polymethylene polyphenyl polyisocyanate.

14. The composition of claim 9 wherein said liquid catalyst comprises a solution of potassium lactate in glycerine.

15. The composition of claim 10 wherein said polyfunctional amine is a primary amine.

16. The composition of claim 15 wherein said primary organic polyfunctional amine comprises the amine terminated condensation product of a triol and propylene oxide.

17. The composition of claim 9 wherein there is further included in said composition an organic tertiary amine having a $pK_b$ of 6.5 or less in an amount of from about 3 to 25 percent by weight of said liquid catalyst.

18. A method for forming a one-part, room-temperature latent, curable isocyanate composition comprising the steps of:
blending a liquid trimerization catalyst solution comprising a solution of a metal salt of an organic acid in a lower polyhydric alcohol and having a viscosity of at least 5,000 centipoise at 25°C and containing from about 1 to 25 percent by weight of said solution of a primary or secondary organic polyfunctional amine, with a polyisocyanate selected from the group consisting of aromatic and aliphatic polyisocyanates under conditions of high shear to form a dispersion of droplets of said liquid catalyst solution in said polyisocyanate; and
allowing a capsule shell wall of partially polymerized isocyanate to form about said droplets containing linkages selected from the group consisting essentially of urea, urethane and isocyanurate linkages.

19. The method of claim 18 wherein the method is carried out at a temperature not exceeding about 50°C.

* * * * *

UNITED STATES PATENT AND TRADEMARK OFFICE
CERTIFICATE OF CORRECTION

PATENT NO. : 3,963,680
DATED : June 15, 1976
INVENTOR(S) : Donald R. O'Keefe and Joseph Gasper It is certified that error appears in the above-identified patent and that said Letters Patent are hereby corrected as shown below:

Column 6, line 36, for "pentaery thritol" read --pentaerythritol-- .

Column 6, line 51, for "th" read --the-- .

Column 9, line 25, for "poly-mine" read --poly-amine-- .

Column 12, line 52, between "slow" and "continuous" insert --but-- .

Signed and Sealed this

Seventh Day of September 1976

[SEAL]

Attest:

RUTH C. MASON
Attesting Officer

C. MARSHALL DANN
Commissioner of Patents and Trademarks